(12) United States Patent
Byron et al.

(10) Patent No.: US 9,817,823 B2
(45) Date of Patent: Nov. 14, 2017

(54) ACTIVE KNOWLEDGE GUIDANCE BASED ON DEEP DOCUMENT ANALYSIS

(71) Applicant: International Business Machines Corporation, Armonk, NY (US)

(72) Inventors: Donna K. Byron, Petersham, MA (US); Krishna Kummamuru, Bangalore (IN); Alexander Pikovsky, Lexington, MA (US); Timothy Winkler, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 14/029,788

(22) Filed: Sep. 17, 2013

(65) Prior Publication Data

US 2015/0081714 A1    Mar. 19, 2015

(51) Int. Cl.
    *G06F 17/00*        (2006.01)
    *G06F 17/30*        (2006.01)
                (Continued)

(52) U.S. Cl.
    CPC ...... *G06F 17/30011* (2013.01); *G06F 3/0482* (2013.01); *G06F 3/04842* (2013.01); *G06F 17/22* (2013.01); *G06F 17/2785* (2013.01); *G06F 17/30539* (2013.01); *G06F 17/30705* (2013.01); *G06F 17/30796* (2013.01)

(58) Field of Classification Search
    CPC ........... G06F 17/2785; G06F 17/30796; G06F 17/218
    See application file for complete search history.

(56) References Cited

U.S. PATENT DOCUMENTS 5,907,841 A  *   5/1999   Sumita et al.
6,167,370 A  *   12/2000   Tsourikov ............. G06F 17/272
                                             704/9

(Continued)

FOREIGN PATENT DOCUMENTS

CN         101261623       9/2008
CN         101488151       7/2009

(Continued)

OTHER PUBLICATIONS

Schafer, "Integrating Deep and Shallow Natural Language Processing Components: Representations and Hybrid Architectures," PhD Dissertation, University of Saarlandes, Dec. 2006, Chapters 6 and 7.

*Primary Examiner* — Laurie Ries
(74) *Attorney, Agent, or Firm* — VanLeeuwen & VanLeeuwen; Reza Sarbakhsh

(57) ABSTRACT

An approach is provided for an information handling system to present knowledge-based information. In the approach, a semantic analysis is performed on the document with the analysis resulting in various sets of semantic content. Each of the sets of semantic content corresponds to an area in the document. The areas of the document are visually highlighted using visual indicators that show the availability of the sets of semantic content to a user via a user interface. In response to a user selection, such as a selection using the user interface or a user specified configuration setting, a selected set of semantic content is displayed to the user using the interface.

11 Claims, 8 Drawing Sheets

(51) Int. Cl.
  *G06F 3/0482* (2013.01)
  *G06F 3/0484* (2013.01)
  *G06F 17/22* (2006.01)
  *G06F 17/27* (2006.01)

(56) References Cited

U.S. PATENT DOCUMENTS

| | | | |
|---|---|---|---|
| 6,584,469 B1* | 6/2003 | Chiang et al. | |
| 7,065,707 B2* | 6/2006 | Chen et al. | 715/234 |
| 7,117,207 B1* | 10/2006 | Kerschberg | G06F 17/30702 |
| 7,783,642 B1* | 8/2010 | Feng et al. | 707/739 |
| 7,958,444 B2* | 6/2011 | Jacquin et al. | 715/232 |
| 8,108,410 B2* | 1/2012 | Strosaker et al. | 707/750 |
| 8,131,539 B2 | 3/2012 | Liu et al. | |
| 8,280,984 B2* | 10/2012 | Lance et al. | 709/219 |
| 8,332,345 B1* | 12/2012 | Murphy | G06N 5/02 706/50 |
| 8,407,217 B1 | 3/2013 | Zhang | |
| 8,756,498 B2 | 6/2014 | Nakajima | |
| 9,015,153 B1* | 4/2015 | Zhang | 707/723 |
| 2002/0107844 A1* | 8/2002 | Cha | G06F 17/30684 |
| 2003/0050927 A1* | 3/2003 | Hussam | 707/5 |
| 2004/0139400 A1* | 7/2004 | Allam et al. | 715/526 |
| 2005/0028077 A1* | 2/2005 | Wen et al. | 715/500.1 |
| 2007/0074108 A1* | 3/2007 | Xie et al. | 715/517 |
| 2007/0100915 A1* | 5/2007 | Rose et al. | 707/205 |
| 2007/0276871 A1* | 11/2007 | Fu et al. | 707/104.1 |
| 2007/0300017 A1* | 12/2007 | Snijder et al. | 711/148 |
| 2008/0147788 A1* | 6/2008 | Omoigui | 709/203 |
| 2008/0162456 A1* | 7/2008 | Daga | G06F 17/30675 |
| 2008/0162498 A1* | 7/2008 | Omoigui | 707/10 |
| 2008/0228806 A1* | 9/2008 | Davies | H04L 67/02 |
| 2008/0320400 A1* | 12/2008 | Smith | G06F 8/38 715/760 |
| 2009/0006993 A1* | 1/2009 | Tuli et al. | 715/764 |
| 2009/0276420 A1* | 11/2009 | Qiu | 707/5 |
| 2009/0287678 A1* | 11/2009 | Brown et al. | 707/5 |
| 2010/0174997 A1* | 7/2010 | O'Sullivan et al. | 715/751 |
| 2010/0228693 A1* | 9/2010 | Dawson | G06F 17/2705 706/12 |
| 2010/0318558 A1* | 12/2010 | Boothroyd | G06F 17/30731 707/769 |
| 2010/0332404 A1* | 12/2010 | Valin | G06Q 30/0239 705/310 |
| 2011/0055188 A1* | 3/2011 | Gras | 707/706 |
| 2011/0131487 A1* | 6/2011 | Nakajima | 715/259 |
| 2011/0179115 A1* | 7/2011 | Castro | H04L 29/06401 709/204 |
| 2011/0184983 A1* | 7/2011 | Kwantes | G06F 17/30716 707/776 |
| 2011/0191316 A1* | 8/2011 | Lai et al. | 707/706 |
| 2012/0131491 A1* | 5/2012 | Lee | 715/776 |
| 2012/0179680 A1* | 7/2012 | Isaacson et al. | 707/737 |
| 2012/0246105 A1* | 9/2012 | James | 706/47 |
| 2013/0138696 A1* | 5/2013 | Turdakov | G06F 17/30734 707/794 |
| 2013/0159346 A1* | 6/2013 | Kasravi | G06F 17/30684 707/771 |
| 2013/0191735 A1* | 7/2013 | Kumar et al. | 715/254 |
| 2013/0262092 A1* | 10/2013 | Wasick | 704/9 |

FOREIGN PATENT DOCUMENTS

| | | |
|---|---|---|
| CN | 101963966 | 2/2011 |
| CN | 102081590 | 6/2011 |

* cited by examiner

ACTIVE KNOWLEDGE GUIDANCE BASED ON DEEP DOCUMENT ANALYSIS

BACKGROUND OF THE INVENTION

The present application relates generally to an improved data processing apparatus and method and more specifically to mechanisms for providing guidance to viewers of documents by performing deep document analysis on the documents and then using various user interface techniques to provide the user with active knowledge guidance as to semantic content related to the document that is being viewed.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, New York. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Historically there have been two kinds of systems—structured data-based and document-based. Traditional enterprise user interfaces presents an interface to linked, structured data; accordingly, screens and navigation between screens reflect the model and content of these objects. These systems present data in a manner designed to maximize informativeness and ease of use. Accordingly, information is judiciously selected with information density being high while ease of use is also high. However, such traditional systems are closed-end systems and are limited to the available structured content. In contrast, document-based systems present more shallow information density, but can be more open-ended and also provide access to more information than structured data interfaces. Traditional document-based systems generally provide inferior user experience when compared with their structured data counterparts. In traditional document-based interfaces, information density is generally lower and ease of use is also lower than with structured data interfaces.

SUMMARY

An approach is provided for an information handling system to present knowledge-based information. In the approach, a semantic analysis is performed on the document with the analysis resulting in various sets of semantic content. Each of the sets of semantic content corresponds to an area in the document. The areas of the document are visually highlighted using visual indicators that show the availability of the sets of semantic content to a user via a user interface. In response to a user selection, such as a selection using the user interface or a user specified configuration setting, a selected set of semantic content is displayed to the user using the interface.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
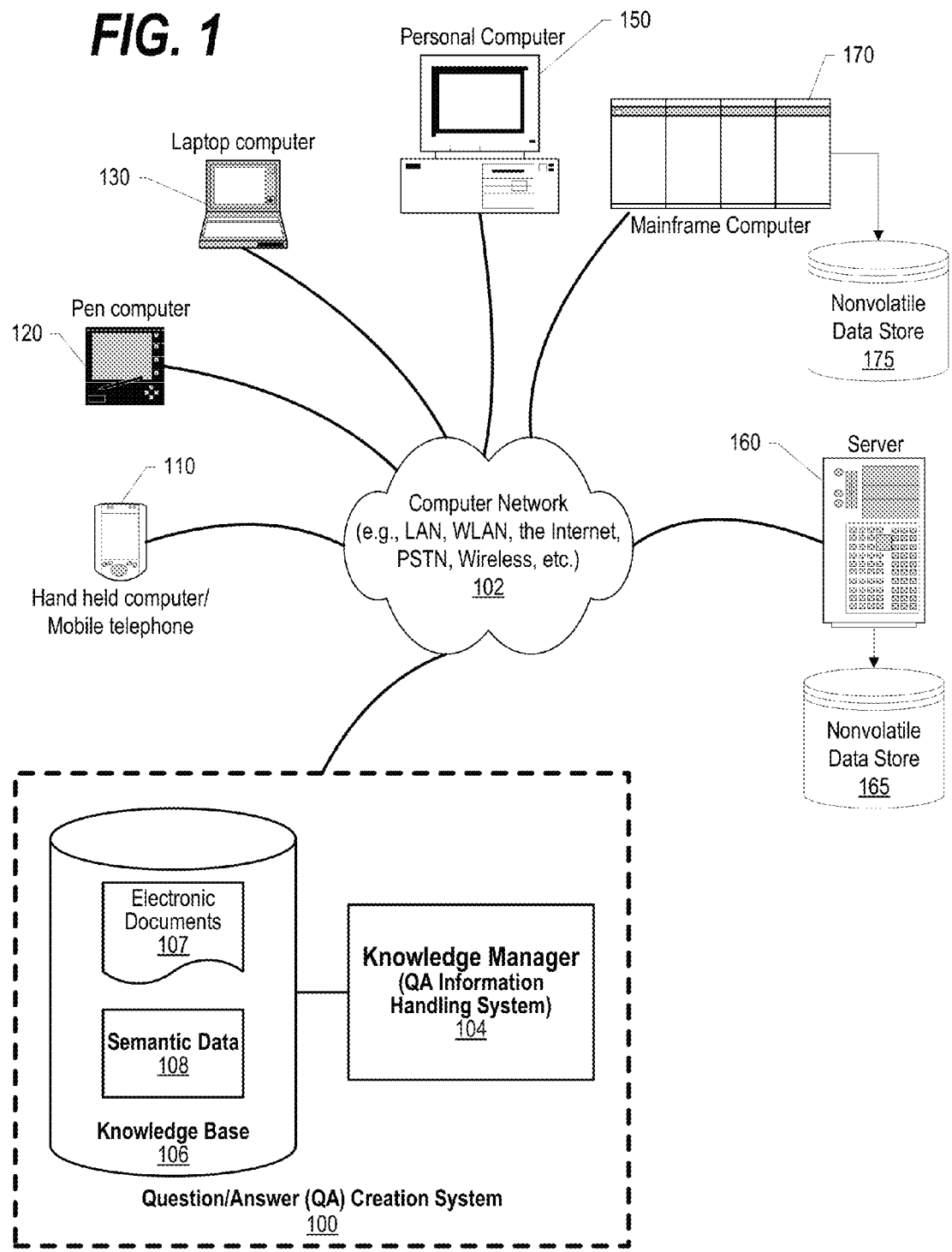
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
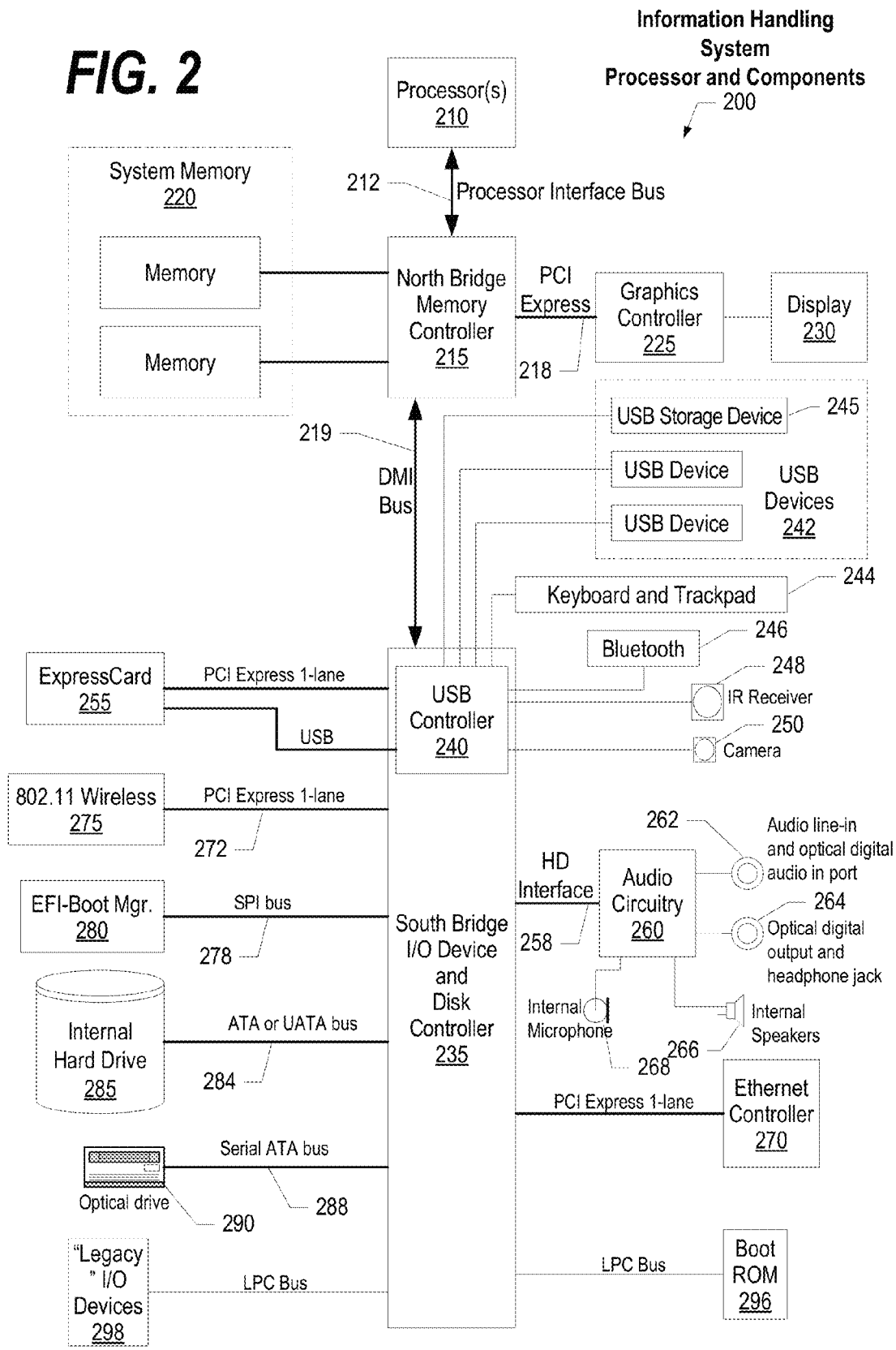
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system, to provide active document knowledge guidance based on deep document analysis using a knowledge management system, such as knowledge manager 100 shown in FIG. 1. The approach described herein improves the user experience when viewing a document by pro-actively making deep knowledge available as an interactive layer or other visual indicator that contains additional knowledge, inferences, and associations discovered by deep semantic analysis of the document. In one embodiment, the discovery of deep semantic analysis is performed by a process similar to corpus preparation. The approach presents the inferred knowledge to the user via a number of user interface techniques, thus allowing the user to directly interact with the available knowledge, navigate through the knowledge thus displayed, filter out unwanted knowledge annotations, etc. In this manner, the surface text, instead of being a flat surface with hyperlinks, becomes a collaborative task space where a computer and human user can present full extent of knowledge about the subject in the document to each other. The extent of the knowledge available by the system through semantic analysis and the user may be much broader and deeper than the surface text suggests. The approach discussed above is further described in FIGS. 3-8 and accompanying detailed descriptions, discussed below, which provide further details related to one or more embodiments that provide active document knowledge guidance based on deep document analysis using a knowledge manager.

Figure 3:
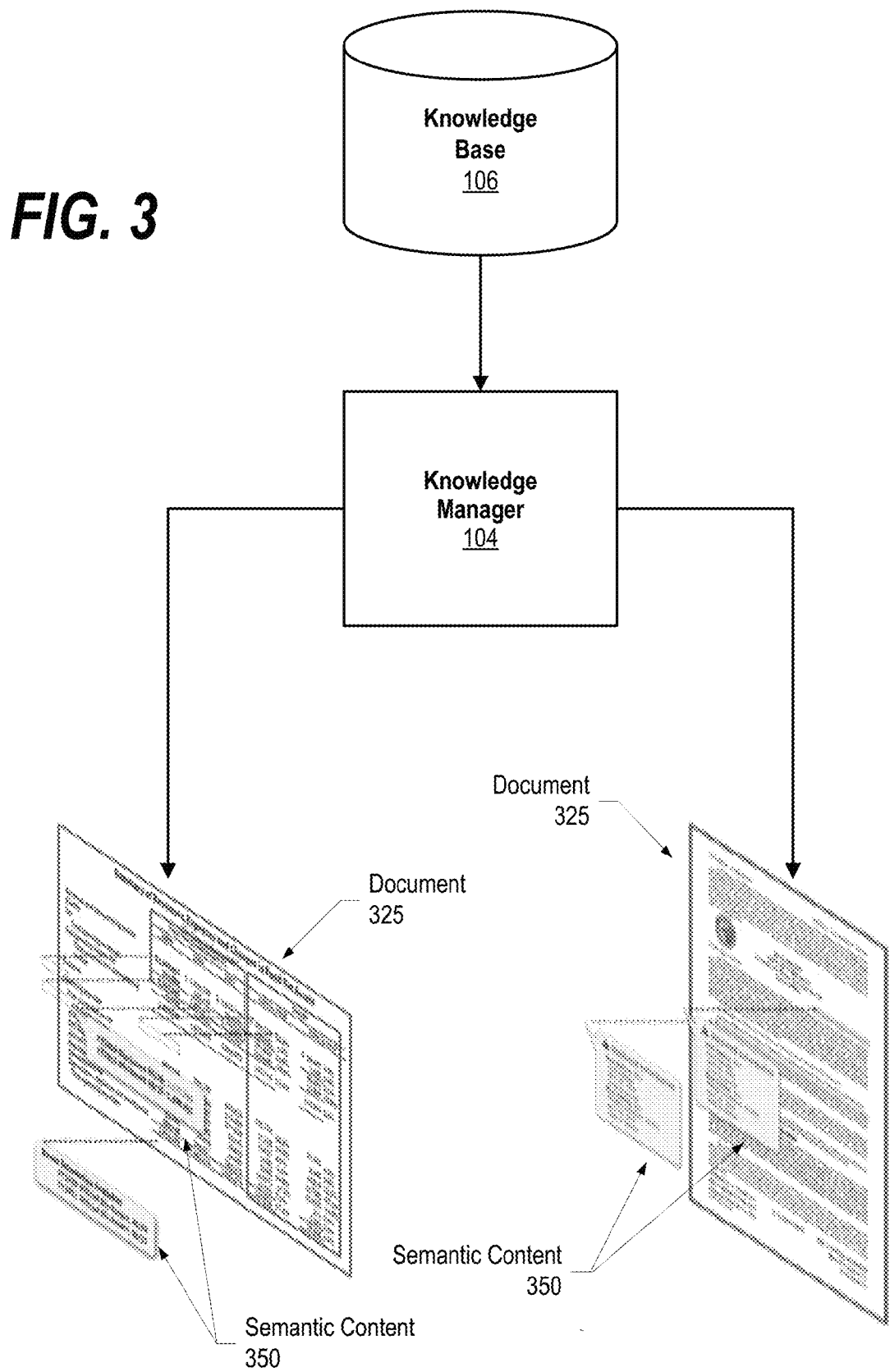
FIG. 3 is a component diagram depicting a knowledge manager providing active knowledge guidance based on deep document analysis.

FIG. 3 is a component diagram depicting a knowledge manager providing active knowledge guidance based on deep document analysis. Knowledge manager 104 performs a semantic analysis on document 325 which results in one or more sets of semantic content 350. As previously described, the knowledge manager utilizes knowledge base 106, which is a vast source of information, to find the semantic content related to the document. The various sets of semantic content correspond to different areas of document 325. A user interface is provided so that the various sets of semantic content can be visually shown, or indicated, to a user on a display screen using a variety of visual effects or techniques. The user can then view or otherwise work with the displayed semantic content using the user interface displayed to the user on a display screen.

The various effects, or indicators, can include visual techniques such as displaying a highlight on the corresponding area of the document, displaying an overlay of the semantic content on the document, displaying an annotation on the document of all or part of the semantic content, displaying an information bubble proximate on the document of all or part of the semantic content, displaying a markup on the document that is proximate to the corresponding area of the document that alerts the user to the semantic content, displaying a display layer of the semantic content on the document, displaying a flyover on the document of all or part of the semantic content, and displaying a selectable icon near the corresponding area that alerts the user of the semantic content. The semantic content may be overlaid on the same screen or area of the screen or may be shown in a separate screen area.

The visual indicator used to alert the user of the availability of the semantic content can be based on the type of semantic content found. One type of semantic content is additional information that corresponds to a chart or a table in the document. Another type of semantic content is content that is more up-to-date than content found in the document, with the visual indicator informing the user that more up-to-date information is available. Another type of semantic content is content that is linked or related to an area of the document, such as a chapter, discussion, etc. Semantic content also includes any related semantic content that forms a functional block that can be embodied as live code objects to perform computations dynamically based on user interaction with the document and/or semantic content.

A user might browse a financial document and the system would detect that more recent information is available and the more recent information would be proactively displayed indicating, for example, that the credit rating of the company in the financial document is outdated and a new credit rating would be displayed based on newer information identified by the system. Deep analysis could also identify a set of tables rendered in a document, in which functional signature has been analyzed such that the document is recognized as containing official municipal statements. Based on that classification, known functional blocks are automatically recognized and analyzed by the system. A well-known functional block for a summation of revenue categories is annotated. The system further automatically highlights the sources of revenue computations as well as other linked cells. The system may also provide a callout or other highlight indicating that the information was amended in a subsequent filing.

In another example, the user enters 'sources of revenue' in a search field provided by the system. The financial document being viewed by the user has no mention of sources of revenue. However, the user's question is answered by the system via deep question analysis and semantical alignment. In this manner, the system aligns semantics of 'revenue sources' with the names of revenue components in the functional block for revenue composition.

In a further example, suppose a user's cursor is positioned over a cell that has discovered knowledge (e.g., the discovered knowledge is a computed value and the system 'understands' the computation and the meaning; and/or the cell is a source for some other computed value). In this example, the system hints at what data influenced the value of the cell, and which cells depend on its value. In addition, if there is a more recent info available (i.e. the cell represents operational revenue for FY'2011 and there is a more recent information for FY'2013, the system can proactively display such updated information to the user.

In yet another example, through deep document analysis and understanding, the presentation of a document can be augmented by the system with a derived list of key entities in a legal document, along with added navigational aids such as table of contents, chains, cross-document comparisons, etc. Using this technique, a person viewing the document is not limited by the information, summaries, and inter-relations that were created by the document's author. Subsequent data augmentation can be overlaid/embedded into the original to make a document less a passive information layout and, instead, more resemble a live software object.

In one embodiment, user configuration settings are used to control the type of semantic content shown on the user interface as well as the visual indicator, or technique, used to display desired semantic content to the users. Some visible indicators, such as an overlay, display layer, etc., may show the semantic content without further user intervention being needed. Other visual indicators may show part of the semantic content and, if the user desires to see more of the semantic content, the user can select the visual indicator. For example, an information bubble may show part of the semantic content and, if the user wishes to view more of the semantic content, the user simply selects the information bubble and the semantic content is displayed (e.g., as an overlay, in a new window, etc.). Other visual indicators, such as an icon, may indicate the availability and/or type of available semantic content without displaying much of the actual semantic content, with the user selecting the visual indicator to view the associated semantic content. For example, if the user is viewing company financial data and newer financial data is available, an icon may be displayed proximate to the financial data alerting the user to the fact that newer data is available. If the user is performing a historical analysis, he may be already be aware that the data is older. However, if the user is performing a current analysis, the indication of more up-to-date information may be of great interest and allow the user to select the visual indicator and view the more up-to-date financial data.

Figure 4:
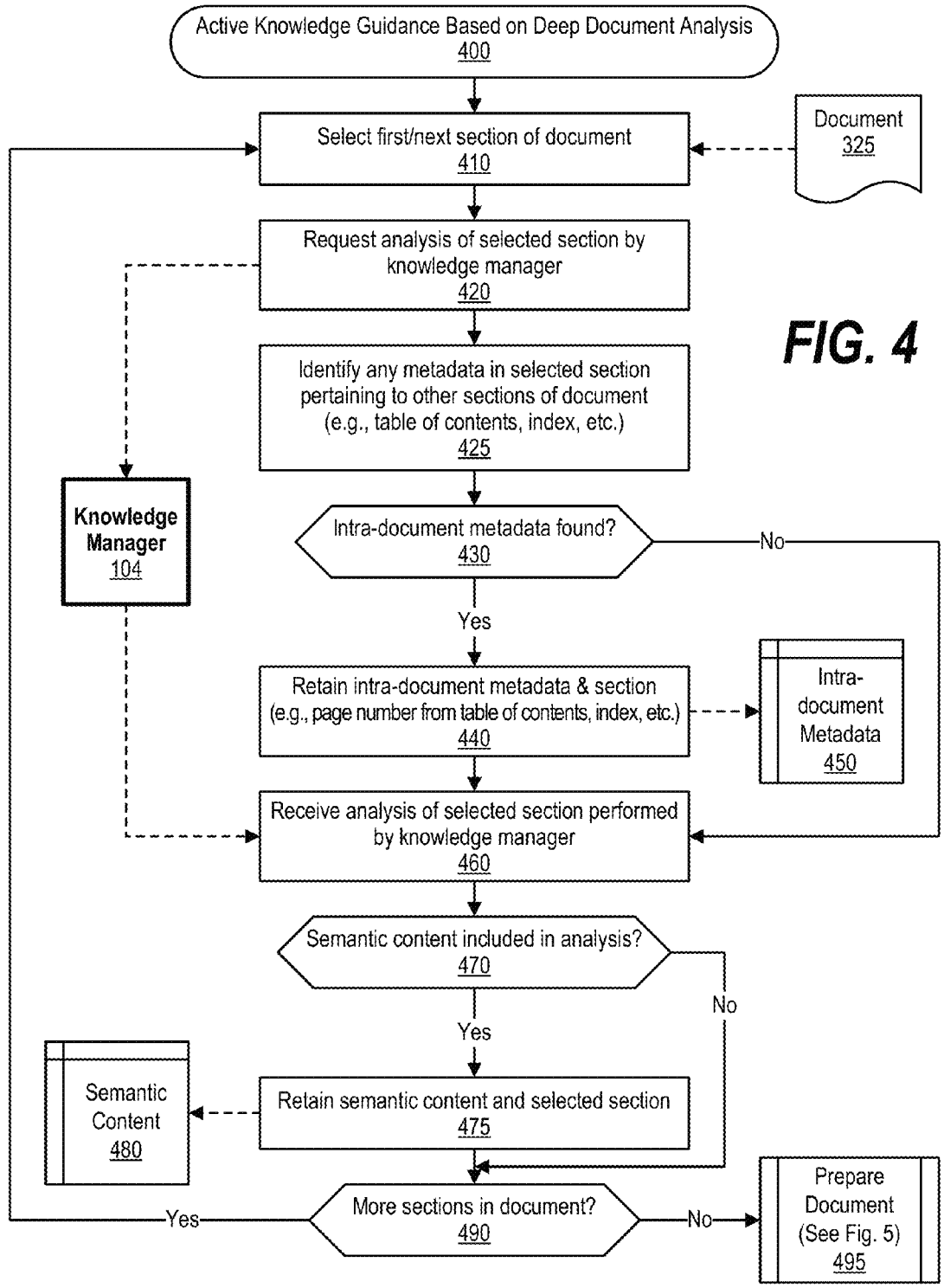
FIG. 4 is a depiction of a flowchart showing the logic used in providing active knowledge guidance based on deep document analysis.

FIG. 4 is a depiction of a flowchart showing the logic used in providing active knowledge guidance based on deep document analysis. Processing commences at 400 with the user viewing, or requesting to view, document 325. Analysis breaks the document into various sections that are analyzed using knowledge manager 104. Sections can be chapters of a document, parts of a document, paragraphs or sentences in a document, tables, charts, and figures in a document, or any other component part of a document.

At step 410, the process selects the first section of document 325. At step 420, the process sends a request for an analysis of the selected section of the document to knowledge manager 104 for deep semantic content analysis of the selected section. At step 425, the process identifies any inter-document metadata in the selected section. Inter-document metadata is metadata that pertains to other sections of document. For example, a table of contents or index would have entries referring to other areas of the document. In addition, a table, graph, or figure may have a textual section located in another part of the document that provides analysis or other support to the table, graph, or figure. If desired, the user can have inter-document metadata identified with visual indicators providing the content related to the metadata (e.g., an overlay of the textual analysis or support related to a figure, etc.). A decision is made as to whether the process identified any inter-document metadata in the selected section (decision 430). If inter-document metadata was identified, then decision 430 branches to the "yes" branch whereupon, at step 440, the process retains the inter-document metadata and section identifier in memory area 450. On the other hand, if no inter-document metadata is identified (or if the user's configuration settings indicate that the user does not wish to see inter-document content in the user interface), then decision 430 branches to the "no" branch bypassing step 440.

At step 460, the process receives the semantic content analysis performed on the selected section of the document that was performed by knowledge manager 104. A decision is made as to whether the semantic content analysis performed by the knowledge manager identified any semantic content related to the selected section of the document (decision 470). If semantic content was identified, then decision 470 branches to the "yes" branch whereupon, at step 475, the process retains the semantic content and the corresponding section identifier in memory area 480. On the other hand, if no semantic content is identified by knowledge manager 104 (or if the user's configuration settings indicate that the user does not wish to see such semantic content in the user interface), then decision 470 branches to the "no" branch bypassing step 475.

A decision is made as to whether there are more sections in the document to be analyzed by the process (decision 490). If there are more sections to be analyzed, then decision 490 branches to the "yes" branch which loops back to select and process the next section of the document as described above. This looping continues until all sections of document 325 have been processed, at which point decision 490 branches to the "no" branch whereupon, at predefined process 495, the process prepares the document for the user (see FIG. 5 and corresponding text for processing details).

Figure 5:
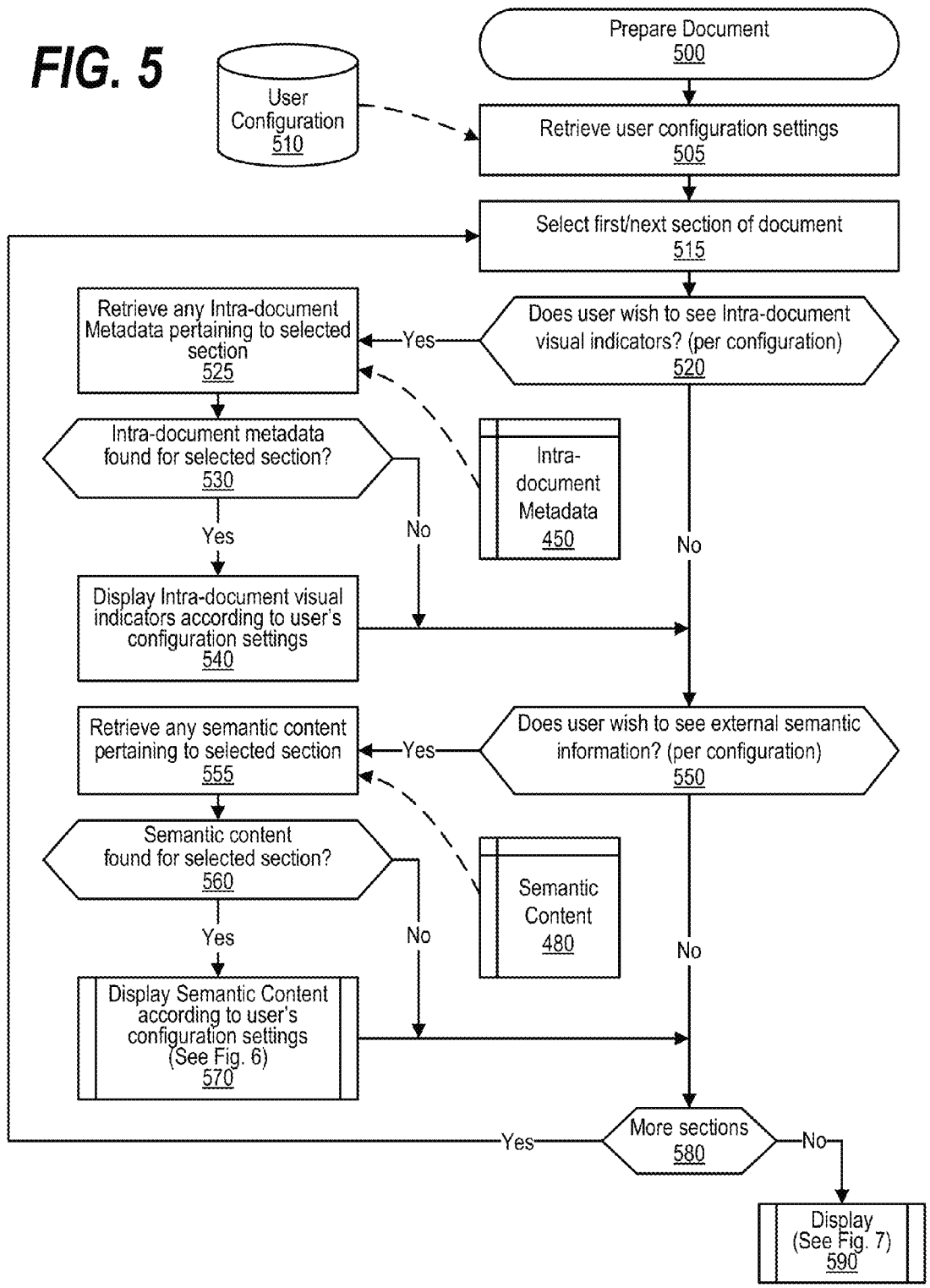
FIG. 5 is a depiction of a flowchart showing the logic used to prepare a document for active knowledge guidance.

FIG. 5 is a depiction of a flowchart showing the logic used to prepare a document for active knowledge guidance. Processing commences at 500 whereupon, at step 505, the process retrieves user configuration settings from data store 510. The user configuration settings have default values and can be updated by the user to indicate the types of metadata and semantic content to display on the user interface as well as how such data should be presented to the user on the user interface.

At step 515, the process selects the first section of the document to prepare it for display on the user interface. A decision is made, based on the user configuration settings, as to whether the user wishes to see intra-document visual indicator (decision 520). If the user wishes to see intra-document visible indicators, then decision 520 branches to the "yes" branch to process any intra-document metadata found for the selected section of the document. At step 525, the process retrieves any intra-document metadata pertaining to the selected section of the document. The metadata is retrieved from memory area 450 and was previously stored in memory area by the processing shown in FIG. 4. A decision is made as to whether any intra-document metadata was found for the selected section of the document (decision 530). If intra-document metadata was found for the selected section of the document, then decision 530 branches to the "yes" branch whereupon, at step 540, the intra-document visible indicators are rendered on the user interface proximate to the display area where the selected section of the document is displayed. The visible indicators used are in accordance with the user's configuration settings. For example, for a table of contents or index entry, the user may have set the configuration settings to display an icon proximate to the entry that the user can select to navigate, or "jump," to the section in the document. Likewise, the user may have set the configuration settings to provide a bubble or overlay for content within the document that provides support or information related to a table, graphic, or figure. The user can read the related content in the bubble or overlay or can select the bubble or overlay to navigate (jump) to the supporting section of the document. Returning to decision 530, if no intra-document metadata was found for the selected section, then decision 530 branches to the "no" branch bypassing step 540. Also returning to decision 520, if the user's configuration settings indicate that the user does not wish to see intra-document active visible indicators, then decision 520 branches to the "no" branch bypassing steps 520 through 540.

A decision is made, based on the user configuration settings, as to whether the user wishes to see semantic content related to the document (decision 550). If the user wishes to see semantic content related to the document, then decision 550 branches to the "yes" branch to process any semantic content found by the knowledge manager for the selected section of the document. A decision is made as to whether any semantic content was found for the selected section of the document (decision 555). If semantic content was found by the knowledge manager for the selected section of the document, then decision 555 branches to the "yes" branch whereupon, at predefined process 570, the process displays the semantic content according to the user's configuration settings (see FIG. 6 and corresponding text for processing details). On the other hand, if no semantic content was found for the selected section of the document, then decision 560 branches to the "no" branch bypassing predefined process 570. Returning to decision 550, if the user's configuration settings indicate that the user does not wish to see semantic content related to the document, then decision 550 branches to the "no" branch bypassing steps 555 through 570.

A decision is made as to whether there are more sections in the document to be processed (decision 580). If there are more sections to be processed, then decision 580 branches to the "yes" branch which loops back to select and process the next section of the document as described above. This looping continues until all sections of the document have been processed, at which point decision 580 branches to the "no" branch whereupon, at predefined process 590, the process displays the document on the user interface for viewing and interaction by the user (see FIG. 6 and corresponding text for processing details).

Figure 6:
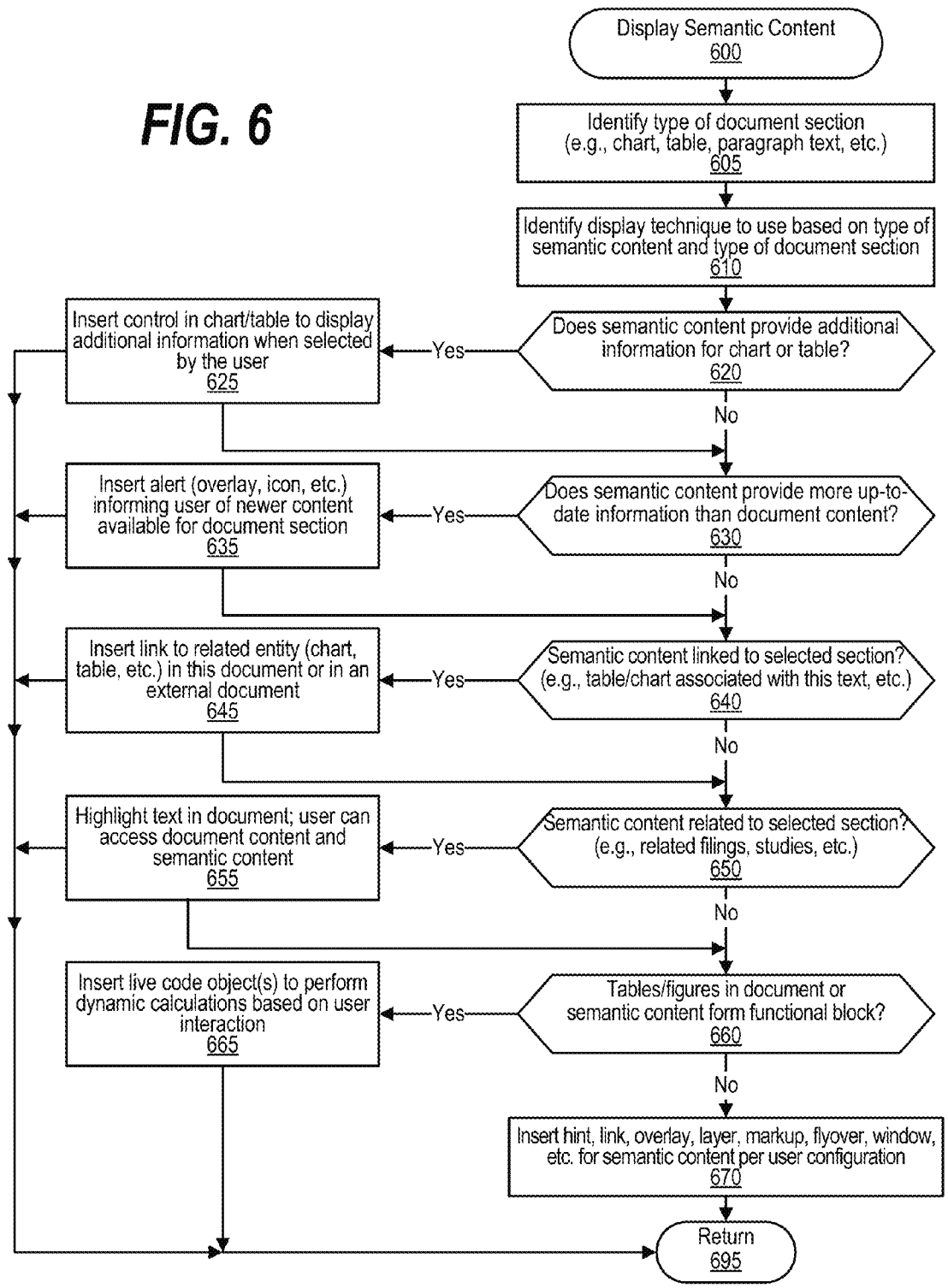
FIG. 6 is a depiction of a flowchart showing the logic performed to display semantic content.

FIG. 6 is a depiction of a flowchart showing the logic performed to display semantic content. Processing commences at 600 whereupon, at step 605, the process identifies the type of document section for which the semantic content was found. At step 610, the process identifies a display technique, or visual indicator, to use with the user interface based on the type of semantic content found and type of document section. The processing that follows, from decision 620 to step 670, is based upon example user configuration settings that might be used as default values to use if the user does not indicate a visual indicator preference. The visible indicators used in steps 625, 635, 645, 655, and 665 may be changed based upon the user's preferences specified in the user configuration settings. In addition, the user may have preferences that indicate that a particular type of semantic content is to be inhibited (not shown) on the user interface.

The following are descriptions of the example visible indicators shown in FIG. 6 used for the various types of semantic content and types of document sections. A decision is made as to whether the semantic content found provides additional information related to a chart, figure, or table in the document (decision 620). If the semantic content provides additional information related to a chart, figure, or table in the document, then decision 620 branches to the "yes" branch whereupon, at step 625, the process inserts a control in the chart/table/figure in the document that informs the user that additional information is available when the control is selected by the user. Processing then returns to the calling routine (see FIG. 5) at 695. On the other hand, if the semantic content does not provide additional information related to a chart, figure, or table in the document, then decision 620 branches to the "no" branch for further processing.

A decision is made as to whether the semantic content found provides more up-to-date information than the information found in the document (decision 630). For example, in a financial report, the semantic content might be newly released financial figures that are newer than the figures provided in the document. If the semantic content provides more up-to-date information than the information found in the document, then decision 630 branches to the "yes" branch whereupon, at step 635, the process inserts an visual indicator alert, such as an icon or overlay, that informs the user of the newer content available in the semantic content with the more up-to-date content being available via the visual indicator. Processing then returns to the calling routine (see FIG. 5) at 695. On the other hand, if the semantic content does not provides more up-to-date information than the information found in the document, then decision 630 branches to the "no" branch for further processing.

A decision is made as to whether the semantic content found is content that is linked to the document section (decision 640). An example of a semantic content link might be a chart, table, or figure found in the semantic content that corresponds to text found in the document. If the semantic content is content that is linked to the document section, then decision 640 branches to the "yes" branch whereupon, at step 645, the process inserts a visual indicator link in the document display that informs of the semantic content and allows the user to navigate to, or view, the semantic content via the visual indicator. Processing then returns to the calling routine (see FIG. 5) at 695. On the other hand, if the semantic content is not content that is linked to the document, then decision 640 branches to the "no" branch for further processing.

A decision is made as to whether the semantic content is related to the section of the document (decision 650). For example, a related filing, article, study, or the like that is pertinent to the area of the document. If the semantic content is related to the section of the document, then decision 650 branches to the "yes" branch whereupon, at step 655, the process inserts an visual indicator alert, such as a highlight or information bubble, that informs the user of the related information available in the semantic content with the related content being available to the user via the visual indicator. Processing then returns to the calling routine (see FIG. 5) at 695. On the other hand, if the semantic content is not related to the section of the document, then decision 650 branches to the "no" branch for further processing.

A decision is made as to whether data, such as tables and/or figures in the document or in a semantic content forms a functional block (decision 660). For example, the deep analysis performed by the knowledge manager might find a set of tables rendered in a document, in which functional signature has been analyzed such that the document is recognized as containing official municipal statements. Based on the classification, known functional blocks are recognized and analyzed. A functional block for a summation of revenue categories can be annotated and shown by a visual indicator. If such a functional block is found, then decision 660 branches to the "yes" branch whereupon, at step 665, the process inserts a live code object that performs dynamic calculations based on user interaction with the figures included in the document and/or related semantic content. Processing then returns to the calling routine (see FIG. 5) at 695. On the other hand, if a functional block has not been identified, then decision 660 branches to the "no" branch for further processing.

At step 670, if the semantic content did not match any of the previously described types of semantic content, then a visual indicator, such as a hint, a link, an overlay, a bubble, a layer, a markup, a flyover, a window, etc., is inserted in the user interface to alert the user of the semantic content and allow the user to view such content. Processing then returns to the calling routine (see FIG. 5) at 695.

Figure 7:
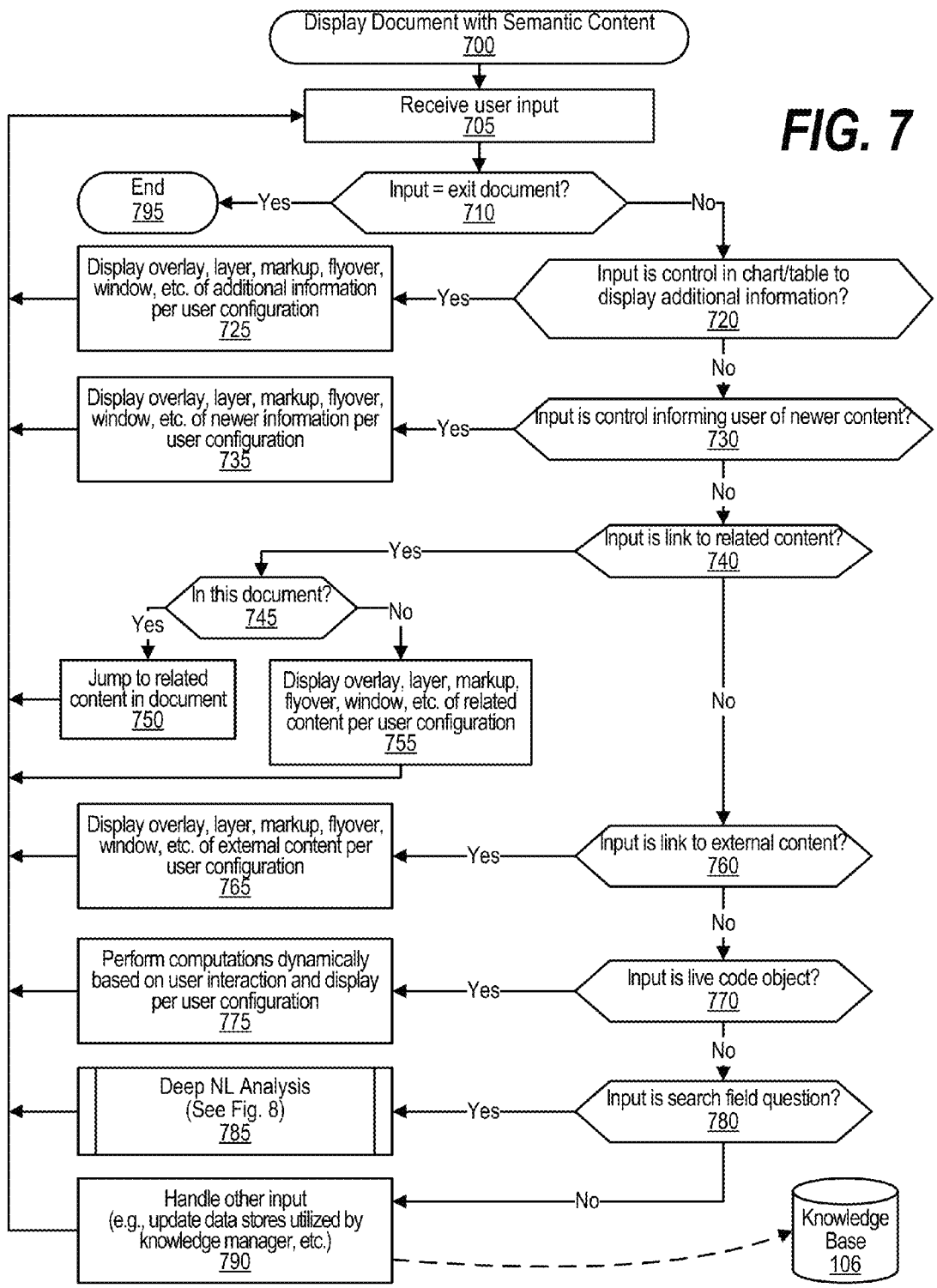
FIG. 7 is a depiction of a flowchart showing the logic used to a document with semantic content.

FIG. 7 is a depiction of a flowchart showing the logic used to a document with semantic content. Processing commences at 700 whereupon, at step 705, the process receives user input from a user that is interacting with the user interface upon which the document and various visible indicators is being displayed. A decision is made as to whether the user wishes to exit the process and stop viewing the document using the user interface (decision 710). If the user is not exiting, then decision 710 branches to the "no" branch to process the user's input. The user's input continues to be processed, as described below, until the user's input is to exit the process, at which point decision 710 branches to the "yes" branch and processing ends at 795.

A decision is made as to whether the user's input is selection of a visual indicator associated with a document chart, table, or figure used to display additional information regarding the chart, table, or figure. If the user's input is selection of such a visual indicator, then decision 720 branches to the "yes" branch whereupon, at step 725, the process displays an overlay, a layer, a markup, a flyover, or a window, etc., that displays the additional semantic content pertaining to the chart, table, or figure. The technique used to display the semantic content is based on the user's configuration settings. Processing then loops back to step 705 to receive the next user input. On the other hand, if the user's input is not a selection of a visual indicator associated with a document chart, table, or figure, then decision 720 branches to the "no" branch for further processing.

A decision is made as to whether the user's input is selection of a visual indicator informing the user of more up-to-date content available for the document (decision 730). If the user's input was selection of a visual indicator informing the user of more up-to-date content available for the document, then decision 730 branches to the "yes" branch whereupon, at step 735, the process displays an overlay, a layer, a markup, a flyover, or a window, etc., that displays the new semantic content pertaining to the document. The technique used to display the more up-to-date semantic content is based on the user's configuration settings. Processing then loops back to step 705 to receive the next user input. On the other hand, if the user's input is not a selection of a visual indicator informing the user of more up-to-date content available for the document, then decision 730 branches to the "no" branch for further processing.

A decision is made as to whether the user's input is selection of a link to content related to the document (decision 740). If the user's input is selection of a link to content related to the document, then decision 740 branches to the "yes" branch whereupon a decision is made as to whether the link is to content within the document (intra-document metadata) or to external semantic content identified by the knowledge manager (decision 745). If the link is to intra-document metadata, then decision 745 branches to the "yes" branch whereupon, at step 750, the portion of the document being displayed jumps to the portion referenced by the link (e.g., a page referenced by an index or table of contents entry, etc.). On the other hand, if the link is to external semantic content identified by the knowledge manager, then decision 745 branches to the "no" branch whereupon, at step 755, the process displays an overlay, a layer, a markup, a flyover, or a window, etc., that displays the semantic content pertaining to the portion of the document selected by the user. The technique used to display the semantic content is based on the user's configuration settings. Processing then loops back to step 705 to receive the next user input. Returning to decision 740, if the user's input is not a selection of a link to content related to the document, then decision 740 branches to the "no" branch for further processing.

A decision is made as to whether the user's input is selection of a link to external semantic content found by the knowledge manager that pertains to the document (decision 760). If the user's input is selection of a link to external semantic content found by the knowledge manager, then decision 760 branches to the "yes" branch whereupon, at step 765, the process displays an overlay, a layer, a markup, a flyover, or a window, etc., that displays the external semantic content pertaining to the portion of the document selected by the user. The technique used to display the semantic content is based on the user's configuration settings. Processing then loops back to step 705 to receive the next user input. On the other hand, if the user's input is not a selection of a link to external semantic content, then decision 760 branches to the "no" branch for further processing.

A decision is made as to whether the user's input is selection of a live code object related to a functional block in the document or in semantic content found by the knowledge manager (decision 770). If the user's input is selection of a live code object, then decision 770 branches to the "yes" branch whereupon, at step 775, the process dynamically performs computations based on the user's interaction with the user interface and the functional block, or blocks, of data found in the document and/or the semantic content. The technique used to display the computations is based on the user's configuration settings. Processing then loops back to step 705 to receive the next user input. On the other hand, if the user's input is not a selection of a live code object, then decision 770 branches to the "no" branch for further processing.

A decision is made as to whether the user's input is entry of a question in a search field found in the user interface (decision 780). If the user's input is entry of a question in a search field found in the user interface, then decision 780 branches to the "yes" branch whereupon, at predefined process 785, a deep natural language (NL) analysis is performed by the knowledge manager based on the user's question (see FIG. 8 and corresponding text for processing details). Processing then loops back to step 705 to receive the next user input. On the other hand, if the user's input is not the entry of a question in a search field, then decision 770 branches to the "no" branch whereupon, at step 790, some other type of user input is handled, such as editing of the user's configuration settings or updating documents or associations in knowledge base 106, etc. Update of knowledge base 106 may depend on the knowledge being exchanged between the knowledge manager and the user. In the case of a company rating change, the user (e.g., financial analyst, etc.) might supply additional information about the reason for the change. Any kind of input technique can be used here to update the knowledge manager. Inputs of text, added links, etc., can be gathered at step 790 and transmitted to the knowledge manager for updates to knowledge base 106. For example, in a legal setting, the system might retrieve relevant cases and the human user can remove or re-rank cases presented. Processing then loops back to step 705 to receive the next user input.

Figure 8:
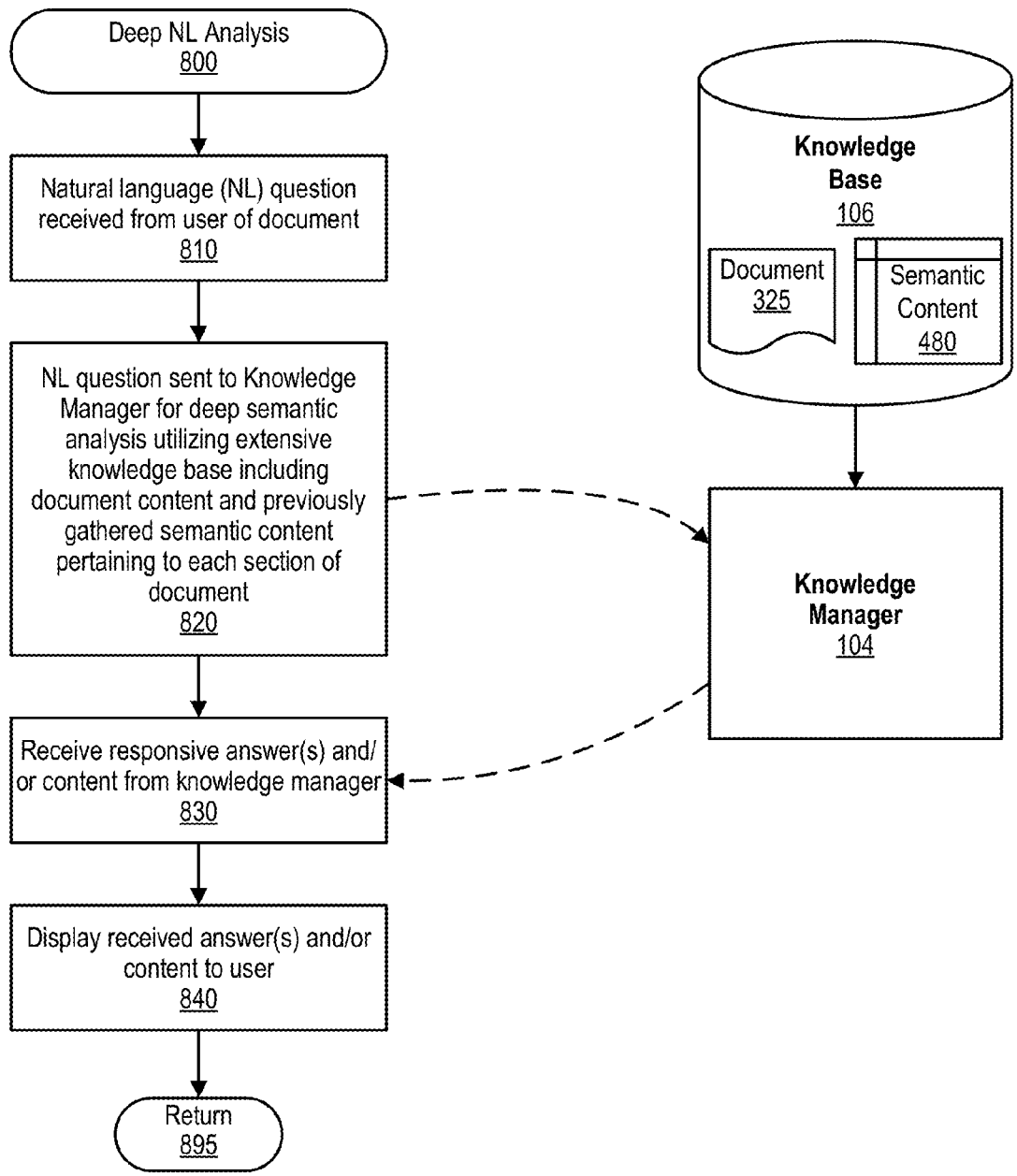
FIG. 8 is a depiction of a flowchart showing the logic performed by the knowledge manager to perform deep natural language analysis.

FIG. 8 is a depiction of a flowchart showing the logic performed by the knowledge manager to serve requests for semantic content. In one embodiment the processing commences at 800 whereupon, at step 810, the process receives a natural language question input by the user at an entry field of the user interface. At step 820, the process sends the natural language question to Knowledge Manager 104 for deep semantic analysis utilizing extensive knowledge base 106. Note that knowledge base 106 includes a vast array of documents and other contents and also includes both the document content 325 as well as semantic content 480 previously identified by the knowledge manager when the document was being prepared for display.

At step 830, the process receives a response from knowledge manager 104. The response may be an answer to a natural language question and may provide content (e.g., semantic content, etc.) found in document 325, previously identified semantic content 480, or other content found within knowledge base 106. At step 840, the received answer(s) and/or content received from the knowledge manager is displayed to the user on the user interface. The technique used to display the answer(s) and/or content is based on the user's configuration settings. Processing thereafter returns to the calling routine (see FIG. 7) at 895.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a display; and
   a set of instructions stored in the memory and executed by at least one of the processors to present knowledge-based information, wherein the set of instructions perform actions of:
   performing a semantic analysis on a selected document, the analysis resulting in one or more sets of semantic content, wherein each of the sets of semantic content correspond to a different area of the selected document, and wherein at least a selected one of the sets of semantic content comprises external semantic information from one or more external documents stored in a knowledge base;

for the selected set of semantic content, selecting a visual indicator, wherein the selected visual indicator identifies an availability and a type of the selected set of semantic content, and wherein selecting the visual indicator comprises:

determining the type of the selected set of semantic content; and retrieving a user configuration setting, wherein the user configuration setting indicates the visual indicator, selected from a plurality of visual indicators, to use for the type of the selected set of semantic content;

preparing the selected document for display in a user interface, wherein the preparing comprises inserting the selected visual indicator in the selected document proximate to the corresponding area;

receiving, from the user interface that is displaying the selected document with the selected set of semantic content, a data change from a user; and sending the received data change to a knowledge manager, wherein the knowledge manager updates the knowledge base that includes the sets of semantic content based on the received data change.

2. The information handling system of claim 1 wherein the visual indicator is selected from a group consisting of displaying a highlight on the corresponding area, displaying an overlay proximate to the corresponding area, displaying an annotation proximate to the corresponding area, displaying an information bubble proximate to the corresponding area, displaying a markup proximate to the corresponding area, displaying a display layer proximate to the corresponding area, displaying a flyover proximate to the corresponding area, and displaying a selectable icon proximate to the corresponding area.

3. The information handling system of claim 1 wherein the actions further comprise:

wherein the type of the selected set of semantic content is selected from a group consisting of additional information for chart or table, more up-to-date information than document content, semantic content linked to the area of the selected document, semantic content related to the area of the selected document, and related semantic content that forms a functional block.

4. The information handling system of claim 1, further comprising displaying the selected set of semantic content in response to a user selection, wherein the displaying comprises:

automatically displaying the selected set of semantic content proximate to the corresponding area in lieu of receiving a user request at the user interface based on the selected visual indicator, wherein the visual indicator is selected from the group consisting of an information bubble, a display layer, and a flyover.

5. The information handling system of claim 1 wherein the actions further comprise:

transmitting a request for the semantic analysis to the knowledge manager, wherein the performance of the semantic analysis further comprises the knowledge manager utilizing the knowledge base to find one or more of the sets of semantic content.

6. A computer program product stored in a computer readable medium, comprising computer instructions that, when executed by an information handling system, causes the information handling system to present knowledge-based information by performing actions comprising:

performing a semantic analysis on a selected document, the analysis resulting in one or more sets of semantic content, wherein each of the sets of semantic content correspond to a different area of the selected document, and wherein at least a selected one of the sets of semantic content comprises external semantic information from one or more external documents stored in a knowledge base;

for the selected set of semantic content, selecting a visual indicator, wherein the selected visual indicator identifies an availability and a type of the selected set of semantic content, and wherein selecting the visual indicator comprises:

determining the type of the selected set of semantic content; and retrieving a user configuration setting, wherein the user configuration setting indicates the visual indicator, selected from a plurality of visual indicators, to use for the type of the selected set of semantic content;

preparing the selected document for display in a user interface, wherein the preparing comprises inserting the selected visual indicator in the selected document proximate to the corresponding area;

receiving, from the user interface that is displaying the selected document with the selected set of semantic content, a data change from a user; and sending the received data change to a knowledge manager, wherein the knowledge manager updates the knowledge base that includes the sets of semantic content based on the received data change.

7. The computer program product of claim 6 wherein the visual indicator is selected from a group consisting of displaying a highlight on the corresponding area, displaying an overlay proximate to the corresponding area, displaying an annotation proximate to the corresponding area, displaying an information bubble proximate to the corresponding area, displaying a markup proximate to the corresponding area, displaying a display layer proximate to the corresponding area, displaying a flyover proximate to the corresponding area, and displaying a selectable icon proximate to the corresponding area.

8. The computer program product of claim 6 wherein the actions further comprise:

wherein the type of the selected set of semantic content is selected from a group consisting of additional information for chart or table, more up-to-date information than document content, semantic content linked to the area of the selected document, semantic content related to the area of the selected document, and related semantic content that forms a functional block.

9. The computer program product of claim 6, further comprising displaying the selected set of semantic content in response to a user selection, wherein the displaying further comprises:

automatically displaying the selected set of semantic content proximate to the corresponding area in lieu of receiving a user request at the user interface based on the selected visual indicator, wherein the visual indicator is selected from the group consisting of an information bubble, a display layer, and a flyover.

10. The computer program product of claim 6 wherein the actions further comprise:

transmitting a request for the semantic analysis to the knowledge manager, wherein the performance of the semantic analysis further comprises the knowledge manager utilizing the knowledge base to find one or more of the sets of semantic content.

11. An information handling system comprising:
one or more processors;
a memory coupled to at least one of the processors;
a display; and
a set of instructions stored in the memory and executed by at least one of the processors to present knowledge-based information, wherein the set of instructions perform actions of:
  performing a semantic analysis on a selected document, the analysis resulting in one or more sets of semantic content, wherein each of the sets of semantic content correspond to a different area of the selected document, and wherein at least a selected one of the sets of semantic content comprises external semantic information from one or more external documents stored in a knowledge base;
  for the selected set of semantic content, selecting a visual indicator, wherein the selected visual indicator identifies an availability and a type of the selected set of semantic content, and wherein selecting the visual indicator comprises:
    determining the type of the selected set of semantic content; and
    retrieving a user configuration setting, wherein the user configuration setting indicates the visual indicator, selected from a plurality of visual indicators, to use for the type of the selected set of semantic content;
  preparing the selected document for display in a user interface, wherein the preparing comprises inserting the selected visual indicator in the selected document proximate to the corresponding area;
  receiving, from the user interface that is displaying the selected document with the selected set of semantic content, a query from a user;
  in response to sending the received query to a knowledge manager, receiving additional content from the knowledge manager; and
  sending the additional content to the user interface for display to the user.

* * * * *